V. CLAIREMONT.
PROCESS OF AND APPARATUS FOR PRESERVING EGGS.
APPLICATION FILED MAR. 10, 1920.
1,370,628. Patented Mar. 8, 1921.
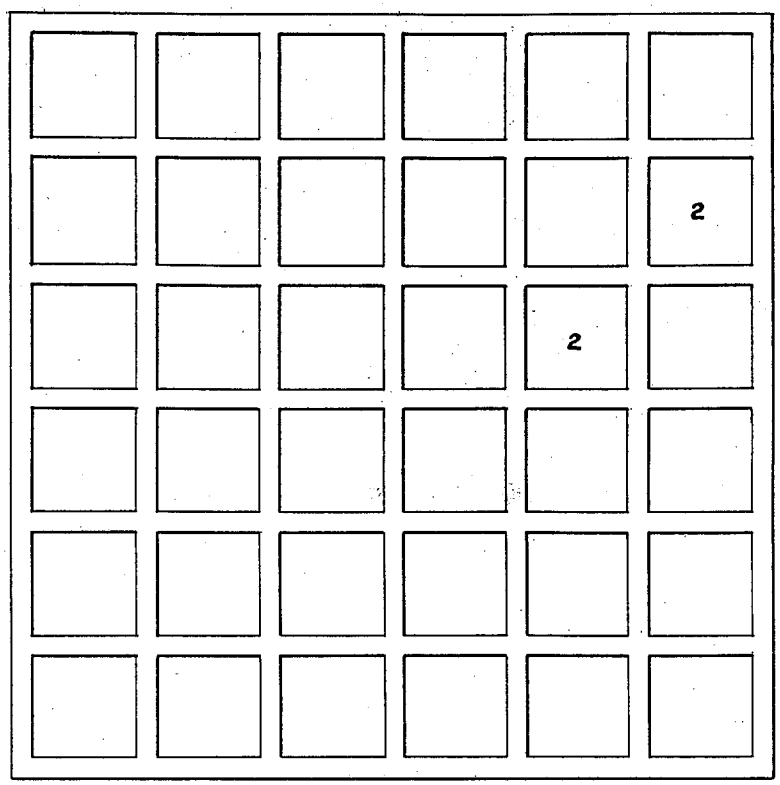
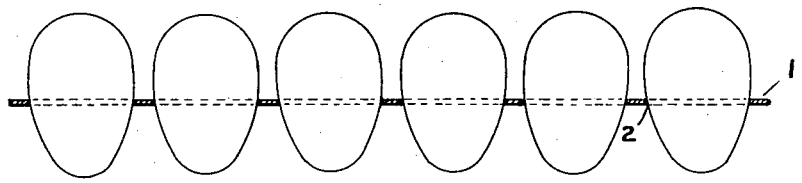
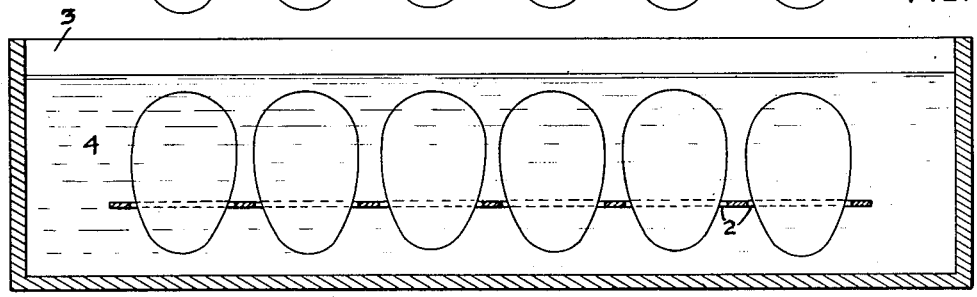
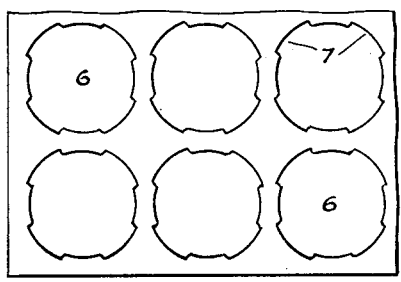
INVENTOR
V. CLAIREMONT
ATT'YS.

UNITED STATES PATENT OFFICE.

VICTOR CLAIREMONT, OF SAN FRANCISCO, CALIFORNIA.

PROCESS OF AND APPARATUS FOR PRESERVING EGGS.

1,370,628.      Specification of Letters Patent.      Patented Mar. 8, 1921.

Application filed March 10, 1920. Serial No. 364,796.

*To all whom it may concern:*

Be it known that I, VICTOR CLAIREMONT, a citizen of the United States, residing at San Francisco, in the county of San Francisco and State of California, have invented new and useful Improvements in Processes of and Apparatus for Preserving Eggs, of which the following is a specification.

The primary object of this invention is to provide a simple and efficacious process of and apparatus for preserving eggs by dipping the eggs in a preserving solution so as to drive out the moisture from between the skin and shell prior to sealing the shell, by said solution.

Heretofore, in preserving eggs, trays or baskets having openings therein receiving and supporting the eggs were dipped into a hot solution to first drive out the moisture from between the skins and shells of the eggs and then seal the shells. Out of a large number of eggs thus treated some were found to have spots on the outside of the skins and while the meat was found to be perfectly fresh, the spotted skins make the eggs unsalable. It is believed that the prevalence of the spotted skins is due to the fact that all of the moisture between the skins and shells was not driven out in the dipping of eggs in the hot solution. As the trays or baskets used to dip the eggs had circular openings and the eggs fitted closely in said openings some of the eggs would stick in the openings and when immersed or dipped would not float momentarily clear of the tray or baskets. Thus, those of the eggs that stuck and whose shells closely contacted with the tray, were sealed where engaged by the tray, and all of the moisture was not driven out. Furthermore eggs which stuck to the tray did not have their shells entirely sealed and air could enter through those of the pores not sealed by the solution and soon spoil the eggs. This is believed to be the reason for the spotting of the skins inasmuch as most of the eggs that were found to be spotted had the spots adjacent the points where the shell engaged with and stuck to the tray or basket.

With my improved method of and apparatus for treating the eggs I dip them in such manner in a hot solution that all of the moisture is driven out from between the skins and shells and all of the pores are sealed and I thus overcome the difficulties and objections such as heretofore encountered.

The invention possesses other advantages and features, some of which, with the foregoing will be set forth at length in the following description where I shall outline in full, that form of the invention which I have selected for illustration in the drawings accompanying and forming a part of the present specification. In said drawings I have shown one form of the construction of my invention but it is to be understood that I do not limit myself to such form, since the invention as expressed in the claims may be embodied in a plurality of forms.

Referring to the drawings:

Figure 1 is a top plan view of the dipping tray of my invention.

Fig. 2 is a sectional view of the tray showing eggs therein.

Fig. 3 is a sectional view through a tank containing the solution showing the tray and eggs, therein, with the eggs buoyed up out of contact with the tray.

Fig. 4 is a fragmentary plan view of a modified form of tray.

In carrying out my invention I provide an egg supporting surface of such character that the eggs will readily float clear of the tray when dipped and all moisture between the shells and skins will thus be permitted to escape and the entire area of the shells will come in contact with the liquid and be sealed. Therefore the method of my invention consists in immersing eggs in a heated preserving solution and causing the eggs to float clear of the support whereby all of the moisture in the eggs between the skins and shells will be driven out through the pores and evaporated and the pores will subsequently be sealed by the solution. The apparatus of the invention comprises a tray 1 having a plurality of egg receiving openings 2 therein of such character and size that several dozen average size eggs may be supported so as to extend partly above and partly below the tray, without contacting with one another, so that the opening is not completely closed but is open in part and permits the solution in which the tray is dipped to readily pass through the opening around the egg. This insures the floating of the egg upwardly and out of contact with the tray when the latter is immersed. The size of the opening is such that the eggs of average size will be supported to permit them to float upwardly slightly out of contact with the tray but not so far that the eggs will float out of the opening all together and fail to drop back into proper place when the tray is lifted. I find that the tray having three dozen openings each approximately one and nine sixteenths inches square gives the desired results.

A suitable tank 3 having a hot preserving solution 4 therein is provided said solution being preferably composed of an odorless, colorless, tasteless, light mineral oil, pine pitch and solid paraffin dissolved in the mixture.

The tank is filled with hot solution and the tray with the eggs held therein is dipped into the tank so as to immerse the eggs as shown in Fig. 3. When the tray is immersed the liquid passes through those portions of the openings 2 not closed by the eggs and effects a more ready buoying up of the eggs away from contact with the tray. The eggs in being thus momentarily spaced from the tray permit all of the moisture between the shells and skins to be driven out through the pores of the shells and the moisture will evaporate and pass off as vapor.

By having square openings in the tray and spacing said openings from one another so that the eggs will not touch one another sticking of the eggs together and the sticking of the eggs in the tray as is the case where round openings are used, are prevented. Eggs thus treated are free from spots on the skins and will keep fresh for a greater period of time than those in which the spots occur.

In Fig. 4 the tray 5 has circular openings 6 with recesses or escallops 7 which latter permit the liquid solution to pass through the openings around the eggs so as to prevent sticking of the eggs in the tray.

The openings in the tray may be of shapes other than those shown as long as said openings each have a greater diameter which exceeds the greater diameter transversely through the eggs supported in the openings.

I claim:—

1. The method of preserving eggs which consists in immersing the eggs in a preserving solution on a supporting surface permitting the solution to pass through the surface and around the egg and causing the egg to float out of contact with the surface.

2. The method of preserving eggs which consists in immersing eggs on a supporting surface in a solution and causing the eggs to momentarily float free of contact with said surface.

3. A tray for supporting eggs to be dipped in preserving solution having openings therein of angular outline.

4. A tray for supporting eggs to be dipped in a preserving solution having square egg receiving openings therein.

5. A tray for supporting eggs to be dipped in a preserving solution having egg receiving openings therein of irregular outline whereby parts of the openings are left open when eggs are supported in the openings.

6. A tray for supporting eggs to be dipped in a preserving solution having egg receiving openings therein the greatest diameters of which openings exceed the greatest transverse diameters of the eggs.

VICTOR CLAIREMONT.